US011346787B2

(12) United States Patent
Tanaka

(10) Patent No.: US 11,346,787 B2
(45) Date of Patent: May 31, 2022

(54) DETECTION SENSOR, DETECTION SENSOR KIT, SENSOR DEVICE, METHOD FOR PRODUCING DETECTION SENSOR, AND DETECTION METHOD

(71) Applicant: KYOCERA CORPORATION, Kyoto (JP)

(72) Inventor: Hiroyasu Tanaka, Kyoto (JP)

(73) Assignee: KYOCERA CORPORATION, Kyoto (JP)

(*) Notice: Subject to any disclaimer, the term of this patent is extended or adjusted under 35 U.S.C. 154(b) by 281 days.

(21) Appl. No.: 16/337,369

(22) PCT Filed: Sep. 27, 2017

(86) PCT No.: PCT/JP2017/035064

§ 371 (c)(1),
(2) Date: Mar. 27, 2019

(87) PCT Pub. No.: WO2018/062320

PCT Pub. Date: Apr. 5, 2018

(65) Prior Publication Data

US 2020/0182798 A1 Jun. 11, 2020

(30) Foreign Application Priority Data

Sep. 30, 2016 (JP) ............................ JP2016-194880

(51) Int. Cl.
*G01N 21/84* (2006.01)
*G01N 35/08* (2006.01)

(52) U.S. Cl.
CPC ......... *G01N 21/8483* (2013.01); *G01N 35/08* (2013.01)

(58) Field of Classification Search
CPC .... G01N 21/8483; G01N 21/84; G01N 35/08; G01N 35/00
(Continued)

(56) References Cited

U.S. PATENT DOCUMENTS

2008/0314456 A1* 12/2008 Ishii .................... H05K 1/0272 137/271

FOREIGN PATENT DOCUMENTS

JP 2009-233532 A 10/2009
JP 2011-002442 A 1/2011
(Continued)

OTHER PUBLICATIONS

Ishige, Yu, et al, English Machine Translation of WO 2014/069551 A1 Description and Claims, published May 8, 2014, obtained on Mar. 2, 2021 from https://worldwide.espacenet.com , pp. 1-107. (Year: 2014).*
(Continued)

*Primary Examiner* — Christine T Mui
(74) *Attorney, Agent, or Firm* — Duane Morris LLP

(57) ABSTRACT

There are provided a detection sensor, a detection sensor kit, a sensor device, a method for producing a detection sensor and a detection method which enable measurement by a simple operation. A detection sensor includes a detecting element, a first member and a second member. The detecting element detects a detection object contained in a sample. The first member includes a first channel portion, and the first channel portion includes a first storage section which stores a reagent which is fed to the detecting element. The second member is movable relative to the first member and includes a second channel portion. In the detection sensor, the first member and the second member are joined with each other and form a joined channel in which the first channel portion and the second channel portion communicate with each other.

15 Claims, 13 Drawing Sheets

(58) Field of Classification Search
USPC ................ 436/164; 73/64.53, 53.01, 64, 53; 422/502, 500, 50
See application file for complete search history.

(56) References Cited

FOREIGN PATENT DOCUMENTS

| | | | |
|---|---|---|---|
| WO | 2013/108608 | A1 | 7/2013 |
| WO | 2014/069551 | A1 | 5/2014 |

OTHER PUBLICATIONS

Yamamoto, K. et al, English Machine Translation of JP 2009-23352 A, Abstract, Description and Claims, published Oct. 15, 2009, obtained on Mar. 2, 2021 from https://worldwide.espacenet.com, pp. 1-56. (Year: 2009).*

* cited by examiner

DETECTION SENSOR, DETECTION SENSOR KIT, SENSOR DEVICE, METHOD FOR PRODUCING DETECTION SENSOR, AND DETECTION METHOD

CROSS-REFERENCE TO RELATED APPLICATIONS

This application is a national stage entry according to 35 U.S.C. 371 of International Application No. PCT/JP2017/035064 filed on Sep. 27, 2017, which claims priority to Japanese Patent Application No. 2016-194880 filed on Sep. 30, 2016, the contents of which are incorporated herein by reference in its entirety.

TECHNICAL FIELD

The present disclosure relates to a detection sensor capable of measurement of the properties or constituent components of a sample, a detection sensor kit, a sensor device, a method for producing a detection sensor, and a detection method.

BACKGROUND

There is a heretofore known surface acoustic wave sensor device for performing surface acoustic wave-aided measurement to determine the properties or constituent components of a liquid sample by detecting an object to be detected contained in the liquid sample via an antibody bound to the surface of the device (refer to WO 2013/108608 Patent Literature 1), for example).

SUMMARY

A detection sensor in accordance with one embodiment of the disclosure includes: a first member including a first channel portion including a first storage section which stores a reagent which is fed to a detecting element that detects a detection object contained in a sample; and a second member including a second channel portion, which is movable relative to the first member. The first member and the second member are joined with each other and forming a joined channel in which the first channel portion and the second channel portion communicate with each other.

A sensor device in accordance with one embodiment of the disclosure includes: the detection sensor described above; and a measurement portion in which the detection sensor is detachably mounted.

A detection sensor kit in accordance with one embodiment of the disclosure includes: a first member including a first channel portion including a first storage section which stores a reagent which is fed to a detecting element that detects a detection object contained in a sample; and a second member including a second channel portion, which is movable relative to the first member. When the first member and the second member are held in a joined state, a joined channel in which the first channel portion and the second channel portion communicate with each other is formed.

A method for producing a detection sensor in accordance with one embodiment of the disclosure, which is a method of producing the detection sensor described above, includes a step of imparting relative movement to the first member and the second member and forming a joined channel in which the first channel portion and the second channel portion communicate with each other.

A detection method in accordance with one embodiment of the disclosure includes: a step of preparing a detection sensor including a first member including a first channel portion including a first storage section which stores a reagent which is fed to a detecting element that detects a detection object contained in a sample, and a second member including a second channel portion, which is movable relative to the first member; a step of joining the first member and the second member together and forming a joined channel in which the first channel portion and the second channel portion communicate with each other; a step of mounting the detection sensor in a measurement portion; a step of introducing a fluid into the joined channel of the detection sensor; a step of feeding the reagent to the detecting element; a step of feeding the sample to the detecting element; and a step of detecting the detection object by the detecting element.

DETAILED DESCRIPTION

Figure 1:
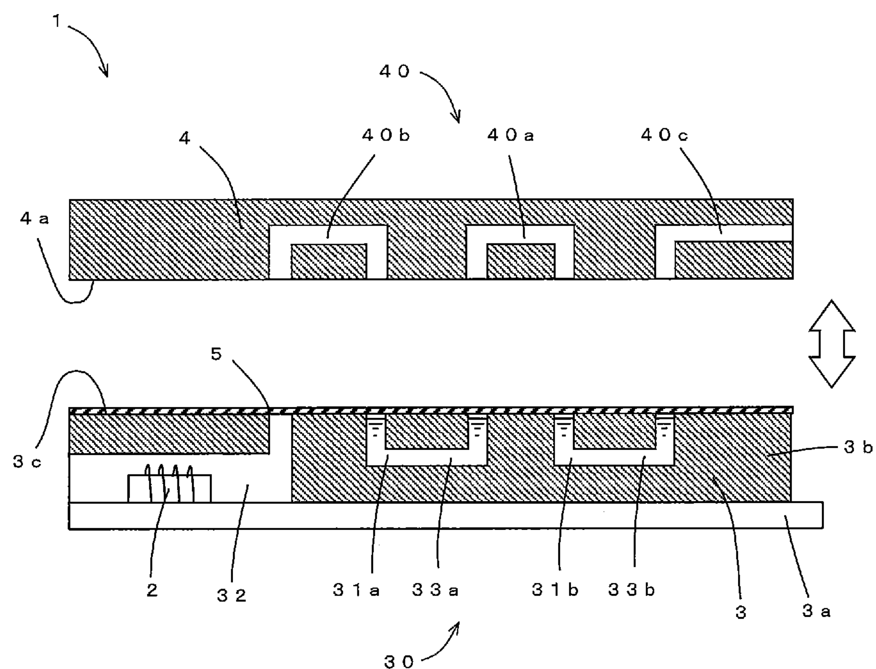
FIG. 1 is a schematic sectional view of a detection sensor 1 in accordance with a first embodiment of the disclosure, illustrating its constituent members held in a separated state.

The following describes the details of embodiments of a detection sensor, a detection sensor kit, and a sensor device according to the disclosure with reference to the drawings. In each of the drawings to be referred to in the following description, like constituent members are identified with the same reference symbols. Moreover, the constituent members are schematically illustrated in each drawing, and thus the size of each member, the distance between the individual members, etc. may not conform to actual dimensions or scales. In the following description, the detection sensor is exemplified by a detection sensor that effects sensing functions for a liquid sample.

For example, in the case of handling a liquid sample containing only a trace of an object to be detected, when, for example, the detection object is bound to an antibody, in some cases, a reagent is continuously fed to a detecting section to achieve detection. At this time, a measurement operator manually feeds a plurality of different reagents to the detecting section in a predetermined order. Due to such a troublesome procedure, the operator may make a mistake in measurement operation, such as a mistake of feeding a wrong reagent, a mistake of feeding reagents in a wrong order, or a mistake of feeding a reagent in a wrong amount.

This concern has created demands for a detection sensor that achieves measurement in simple and easy operation, a detection sensor kit, a sensor device, a method for producing a detection sensor, and a detection method.

A detection sensor in accordance with an embodiment of the disclosure includes a first member and a second member which is movable relative to the first member. The first member includes a first channel portion including a first storage section for storing a reagent which is fed to a detecting element that detects a detection object contained in a sample. The second member includes a second channel portion. The first member and the second member are joined with each other and form a joined channel in which the first channel portion and the second channel portion communicate with each other. The detecting element is located in the flow channel of the first channel portion or the flow channel of the second channel portion. Alternatively, the detecting element may be located outside the detection sensor. In the detection sensor in accordance with an embodiment of the disclosure, for example, the joined channel can be either a linear channel or a bent channel as long as the joined channel is configured to allow a reagent stored in the first storage section to pass interiorly therethrough so that the reagent can reach the detecting element. In the case of making the joined channel in the form of a bent channel, the channel can be either an angulated channel or a curved channel such as an arcuate channel.

For example, in the detection sensor in accordance with an embodiment of the disclosure, the first member including the first channel portion including the first storage section constitutes an upper part of the detection sensor, whereas the second member including the second channel portion for receiving the detecting element in its flow channel constitutes a lower part of the detection sensor. It is preferable that, upon moving the first member and the second member so as to be joined with each other in a vertical direction, the first channel portion and the second channel portion merge with each other in the vertical direction and form a joined channel, and a reagent stored in the first storage section flows downwardly through the linear joined channel so as to be fed onto the detecting element. This makes it possible to effect measurement simply by joining the first member and the second member with each other.

First Embodiment

Figure 2:
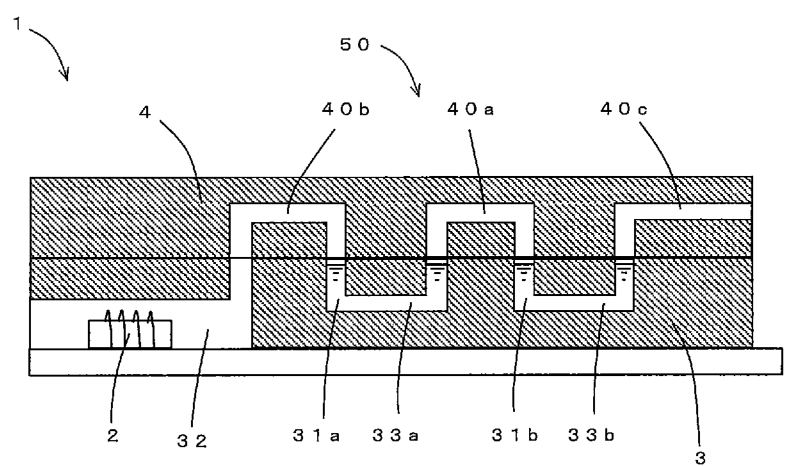
FIG. 2 is a schematic sectional view of the detection sensor 1, illustrating its constituent members held in a joined state.
Figure 3:
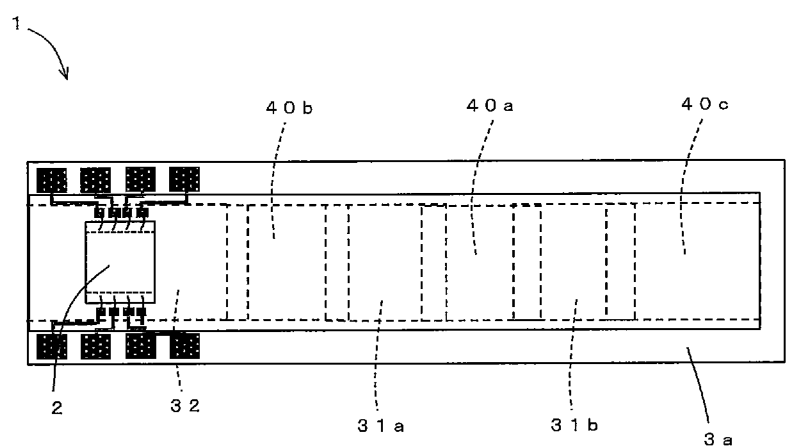
FIG. 3 is a plan view of the detection sensor 1, illustrating its constituent members held in a joined state.

FIG. 1 is a schematic sectional view of a detection sensor 1 in accordance with a first embodiment of the disclosure, illustrating its constituent members held in a separated state. FIG. 2 is a schematic sectional view of the detection sensor 1, illustrating its constituent members held in a joined state. FIG. 3 is a plan view of the detection sensor 1, illustrating its constituent members held in a joined state. In the detection sensor 1 which is at least sucking in or receiving a liquid sample, a electric signal supplied from the exterior is caused to vary according to the properties or constituent components of the liquid sample, and, the varied electric signal is outputted to the outside of the sensor.

The detection sensor 1 includes a detecting element 2, a first member 3, and a second member 4. The detecting element 2 detects a detection object contained in a sample. The first member 3 includes a first channel portion 30, and the first channel portion 30 includes a first storage section 31 for storing a reagent which is fed to the detecting element 2. The second member 4, which is movable relative to the first member 3, includes a second channel portion 40. In the detection sensor 1, the first member 3 and the second member 4 are joined with each other and form a joined channel 50 in which the first channel portion 30 and the second channel portion 40 communicate with each other.

Figure 4:
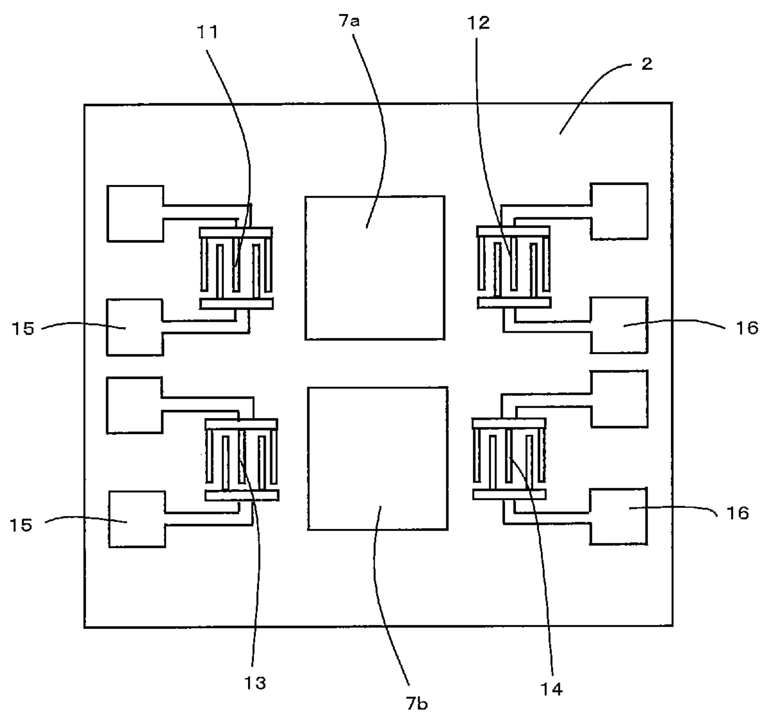
FIG. 4 is a plan view of the detecting element 2.

FIG. 4 is a plan view of the detecting element 2. For example, the detecting element 2 includes a metallic film 7*a* with a reactant immobilized on it for reaction with a detection object. The selection of the reactant may be predicated upon the type of the detection object. For example, where the detection object is a specific protein, cell, or living tissue contained in a liquid sample, then an antibody, and an aptamer made of nucleic acid and peptide may be used as the reactant. In the present embodiment, as a form of reaction between the reactant and the detection object, the reactant and the detection object may be bound to each other under chemical reaction or antigen-antibody reaction. The form of reaction is not limited to this, and alternatively, the detection object may be bound to or adsorbed on the reactant under interaction between the detection object and the reactant.

Upon the contact of the sample with the metallic film 7*a*, in the presence of the reactant, a characteristic of a signal transmitted from a signal-transmitting electrode such as an IDT (InterDigital Transducer) electrode as described later varies according to the type or content of the detection object. The signal having the varied characteristic is received as a detection signal by a signal-receiving electrode such as an IDT electrode. On the basis of the characteristic variation, the detection object contained in the sample can be detected. The signal characteristic employed can be any characteristic that varies with a change in the mass of the metallic film 7*a* without specific limitation. For example, where the signal is of elastic wave signals, the phase of the signal may be employed as the signal characteristic that undergoes variation.

In addition, there is provided a metallic film 7*b* which serves as a reference film for the metallic film 7*a*. The metallic film 7*b* is free of immobilization of a substance which is bound to and reacts with the detection object. Moreover, the metallic film 7*b* may be subjected to surface treatment to lower the extent of its bindability or reactivity to the liquid sample for purposes of stabilization. A signal-transmitting electrode and a signal-receiving electrode such as IDT electrodes are prepared also for the metallic film 7*b*. A signal transmitted from the signal-transmitting electrode passes through the metallic film 7*b*, and, after the passage, the signal is received as a reference signal by the signal-receiving electrode.

The detecting element 2 includes a detection section and a reference section. The detection section includes a first IDT electrode 11 that generates an elastic wave which propagates toward the metallic film 7*a* and a second IDT electrode 12 that receives the elastic wave which has passed through the metallic film 7*a*. The reference section includes a first IDT electrode 13 that generates an elastic wave which propagates toward the metallic film 7*b* and a second IDT electrode 14 that receives the elastic wave which has passed through the metallic film 7*b*. The first IDT electrode 11 and the first IDT electrode 13 are each connected to a pair of first extraction electrodes 15, and the second IDT electrode 12 and the second IDT electrode 14 are each connected to a pair of second extraction electrodes 16. One of the pair of first extraction electrodes 15 and one of the pair of second extraction electrodes 16 are each connected to a plurality of connection terminals of a reader as described later. The other one of the pair of first extraction electrodes 15 and the other one of the pair of second extraction electrodes 16 are disposed so that they can be connected to a ground (earth) electrode of the reader.

In the present embodiment, the first member 3 has the first storage section 31, and a first segmental channel 32 in which the detecting element 2 is located. The first storage section 31 and the first segmental channel 32 are included in the first channel portion 30. In the present embodiment, the first member 3 includes a base 3*a* and a member main body 3*b* disposed on the base 3*a*, and, the first storage section 31 is formed in the member main body 3*b*. The first segmental channel 32 is defined by a space surrounded by a recess formed in the member main body 3*b* and the base 3*a*. The detecting element 2 is mounted on the surface of the base 3*a* that defines the first segmental channel 32. As an alternative to designing the detecting element 2 to be mountable onto the surface of the base 3*a*, for example, the detecting element 2 may be provided in the form of a detection region obtained by disposing an arrangement required for detection of the detection object, such as the metallic film 7*a*, the first IDT electrode 11, and the second IDT electrode 12, directly on the surface of the base 3*a*.

The member main body 3*b* includes, on its side which is opposite the base 3*a*, a first abutting face 3*c* which abuts against the second member 4 upon joining the first member 3 and the second member 4 with each other. The second member 4 includes a second abutting face 4*a* which abuts against the first member 3 upon joining the first member 3 and the second member 4 with each other.

The first storage section 31A encloses a reagent which is necessary for reaction between the detection object and the reactant in the detecting element 2. While a liquid reagent exemplifies the enclosed reagent in the present embodiment, the reagent is not limited to the liquid reagent, and for example, a solid reagent such as a granular reagent and a powdery reagent, or a gaseous reagent can be used. Either a single reagent or a plurality of reagents may be stored in the first storage section 31. In the present embodiment, a plurality of reagents are stored in the first storage section 31. The first storage section 31 includes a first region 31*a* and a second region 31*b*. A first reagent 33*a* is stored in the first region 31*a*, and, a second reagent 33*b*, which differs from the first reagent 33*a*, is stored in the second region 31*b*.

The first storage section 31 may be made in any form that avoids the leakage of the reagent and the incorporation of foreign matter into the reagent for assuring proper storage of the reagent. In the present embodiment, the first storage section 31 is configured so that the reagent can be stored in a recess provided with an opening in the first abutting face 3*c*, and, there is provided a first sealing member 5 that covers the opening to hermetically close the first storage section 31. Like the first storage section 31, the first segmental channel 32 is provided with an opening in the first abutting face 3*c*, and the opening is also covered by the first sealing member 5.

The first sealing member 5 is bonded to the first abutting face 3*c* by glue or adhesive, for example. Without the use of the glue or adhesive, the first sealing member 5 may be welded to the first abutting face 3*c* by lasering or ultrasound welding, for example. The first sealing member 5 is made of a material that causes no degeneration of the reagent in store, prevents the first sealing member 5 from being dissolved in itself by the reagent, and maintains the airtightness and watertightness of the first storage section 31. As the first sealing member 5, it is possible to use, for example, a resin film made of polypropylene resin or polyester resin, or a metal-coated film obtained by applying a metal such as aluminum to the surface of a resin film.

In the present embodiment, prior to joining the first member 3 and the second member 4 together, the measurement operator manually removes the first sealing member 5 bonded to the first member 3 to uncover the first storage section 31, as well as the first segmental channel 32.

In the first member 3, there is no communication between the first storage section 31 and the first segmental channel 32 provided in the first member 3, that is; they are spaced-apart independent channel spaces. Moreover, there is no communication between the first region 31*a* and the second region 31*b* that constitute the first storage section 31, that is; they are spaced-apart independent channel spaces (storage spaces).

The second channel portion 40 provided in the second member 4 includes a connection channel 40*a* which is connected to the first region 31*a* and the second region 31*b* of the first storage section 31 to bring the first region 31*a* and the second region 31*b* into communication with each other upon joining the first member 3 and the second member 4 with each other. The second channel portion 40 includes a connection channel 40*b* which is connected to the first region 31*a* and the first segmental channel 32 to bring the first region 31*a* and the first segmental channel 32 into communication with each other upon joining the first member 3 and the second member 4 with each other. The second channel portion 40 includes a connection channel 40*c* which provides communication between the second region 31*b* and an external space upon joining the first member 3 and the second member 4 with each other.

In the second member 4, there is no communication among the connection channel 40*a*, the connection channel 40*b*, and the connection channel 40*c*, that is; they are spaced-apart independent channel spaces. By joining the first member 3 and the second member 4 with each other so that the first abutting face 3*c* and the second abutting face 4*a* can abut against each other, it is possible to bring the first storage section 31 and the first segmental channel 32 constituting the first channel portion 30 of the first member 3 into communication with the connection channels 40*a*, 40*b*, and 40*c* constituting the second channel portion 40 of the second member 4, and thereby form a single joined channel 50.

As shown in FIG. 2, the joined channel 50 is formed as a flow channel maintained in a hermetically sealed condition, which includes the connection channel 40*c*, the second region 31*b*, the connection channel 40*a*, the first region 31*a*, the connection channel 40*b*, and the first segmental channel 32 that communicate with one another in series in the order named. The connection channel 40*c* communicates with the external space, and thus, from the external space, a fluid such as air can be introduced into the joined channel 50. Upon introduction of a fluid, the fluid forces the second reagent 33*b* stored in the second region 31*b* forwardly to compress a fluid (air) present within the connection channel 40*a*, and the compressed fluid forces the first reagent 33*a* stored in the first region 31*a* forwardly. In consequence, the first reagent 33*a* passes flowingly through the interior of the connection channel 40*b*, reaches the first segmental channel 32, and is fed to the detecting element 2. By continuous introduction of fluids from the external space, the second reagent 33*b* passes flowingly through the first region 31*a* and the connection channel 40*b*, reaches the first segmental channel 32 in the wake of the first reagent 33*a*, and is fed to the detecting element 2. The joined channel 50 is made uniform in channel width and height throughout its length to reduce stagnation of the reagent for the stable flow of the same.

Thus, the reagent required for measurement can be fed to the detecting element 2 simply by joining the first member 3 and the second member 4 with each other. By setting the first reagent 33*a* and the second reagent 33*b* hermetically into the first member 3 in advance, it is possible to avoid a mistake of feeding a wrong reagent. Moreover, as practiced in the present embodiment, in the joined channel 50 in the form of a single flow channel, the first reagent 33*a* is fed to the detecting element 2 first, and thereafter the second reagent 33*b* is fed to the detecting element 2. In cases where a plurality of reagents are manually fed to the detecting element 2, there is a likelihood that the reagents will be fed in a wrong order. In this regard, in the detection sensor 1 according to the present embodiment, the feeding order remains unchanged. This diminishes the likelihood of a mistake of feeding reagents in a wrong order.

Second Embodiment

Figure 5:
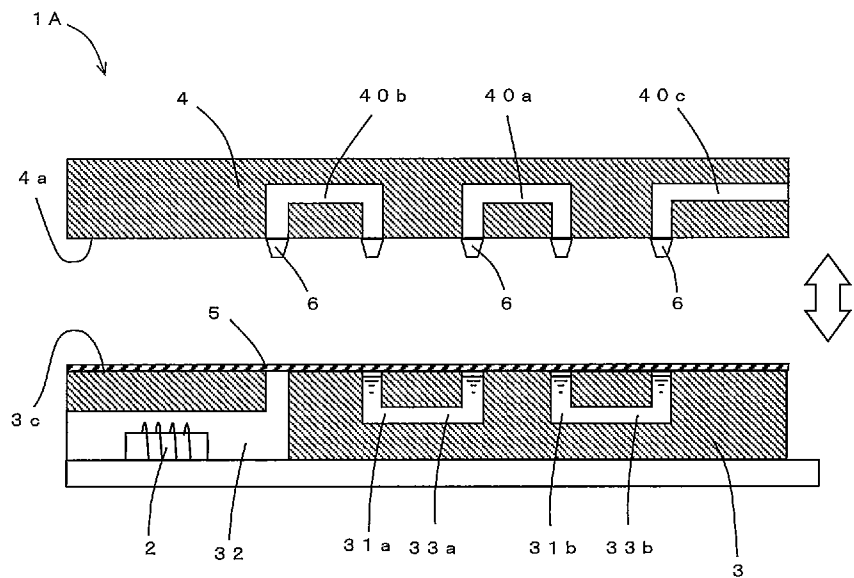
FIG. 5 is a schematic sectional view of a detection sensor 1A in accordance with a second embodiment of the disclosure, illustrating its constituent members held in a separated state.
Figure 6:
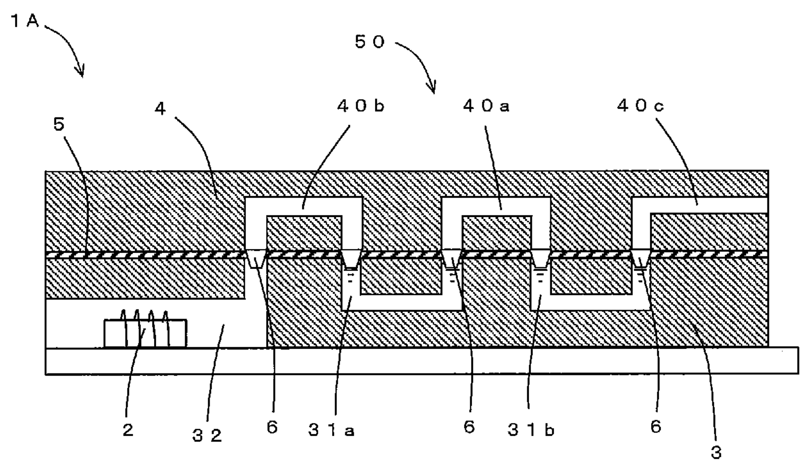
FIG. 6 is a schematic sectional view of the detection sensor 1A, illustrating its constituent members held in a joined state.

FIG. 5 is a schematic sectional view of a detection sensor 1A in accordance with a second embodiment of the disclosure, illustrating its constituent members held in a separated state. FIG. 6 is a schematic sectional view of the detection sensor 1A, illustrating its constituent members held in a joined state. As a point of difference from the detection sensor 1 according to the first embodiment, the detection sensor 1A according to the present embodiment additionally includes a piercing member 6 which serves as an unsealing member. Otherwise, the detection sensor 1A is identical to the detection sensor 1, and thus the components that play the same or corresponding roles as in the detection sensor 1 will be identified with the same reference symbols, and the detailed description thereof will be omitted.

The piercing member 6 is an unsealing member which is provided in the second member 4. At the second abutting face 4*a*, the piercing member 6 is disposed in a part of each of the connection channels 40*a*, 40*b*, and 40*c* that makes connection with the first storage section 31, as well as the first segmental channel 32. The piercing member 6 has the form of a needle or a hollow tube which protrudes from the second abutting face 4*a*, and the protruding end of the piercing member 6 is sharp-pointed for passing piercingly through the first sealing member 5. As is the case with the first embodiment, the first sealing member 5 is made of a resin film or metallic foil, for example. Upon joining the first member 3 and the second member 4 with each other so that the first abutting face 3*c* and the second abutting face 4*a* can abut against each other, the piercing member 6 passes through the first sealing member 5. As shown in FIG. 6, after passing through the first sealing member 5, the piercing member 6 enters corresponding one of the opening of the first storage section 31 and the opening of the first segmental channel 32 in the first abutting face 3*c*, thus constituting part of the joined channel 50.

No specific limitations are imposed on the material used for the above-described piercing member 6 and the form of the piercing member 6 as long as the piercing member 6 be capable of passing through the first sealing member 5 made of a resin film or metallic foil, and when exposed to a reagent passing flowingly through the joined channel 50, the piercing member 6 cause no degeneration of the reagent. Considering that the reagent and a fluid which forces the reagent forwardly pass through the hollow part of the piercing member 6 during measurement operation, the diameter of the hollow part and the diameter of the opening in the tip of the piercing member 6 are determined so that no increase in pressure loss will result.

Thus, the present embodiment eliminates the need to remove the first sealing member 5 prior to joining the first member 3 and the second member 4 with each other. This makes it possible to effect measurement in simpler and easier operation.

Third Embodiment

Figure 7:
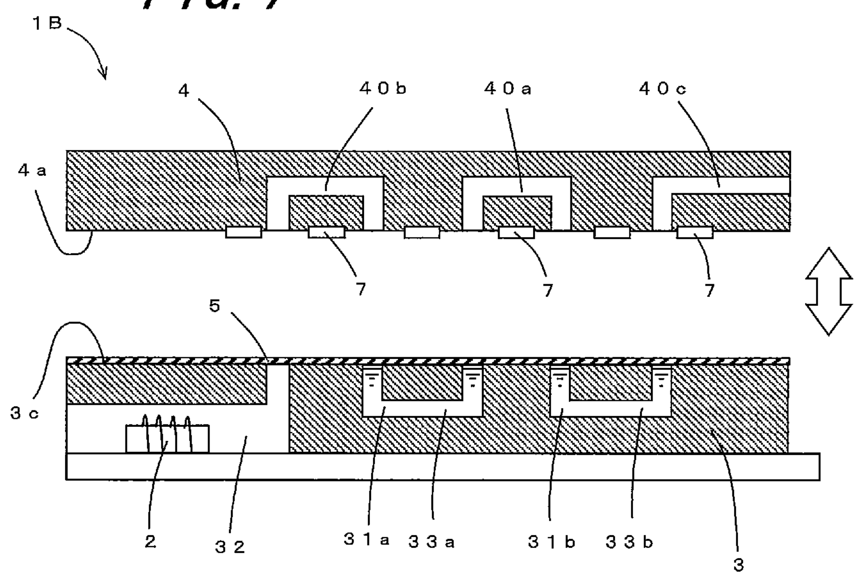
FIG. 7 is a schematic sectional view of a detection sensor 1B in accordance with a third embodiment of the disclosure, illustrating its constituent members held in a separated state.
Figure 8:
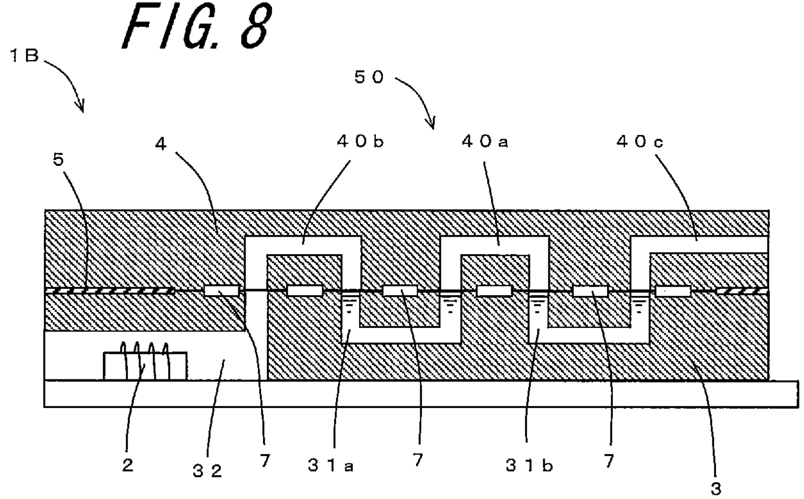
FIG. 8 is a schematic sectional view of the detection sensor 1B, illustrating its constituent members held in a joined state.

FIG. 7 is a schematic sectional view of a detection sensor 1B in accordance with a third embodiment of the disclosure, illustrating its constituent members held in a separated state. FIG. 8 is a schematic sectional view of the detection sensor 1B, illustrating its constituent members held in a joined state. As a point of difference from the detection sensor 1 according to the first embodiment, the detection sensor 1B according to the present embodiment additionally includes a heating member 7 which serves as an unsealing member. Otherwise, the detection sensor 1B is identical to the detection sensor 1, and thus the components that play the same or corresponding roles as in the detection sensor 1 will be identified with the same reference symbols, and the detailed description thereof will be omitted.

The heating member 7 is an unsealing member which is provided in the second member 4. At the second abutting face 4*a*, the heating member 7 is disposed near a part of each of the connection channels 40*a*, 40*b*, and 40*c* that makes connection with the first storage section 31, as well as the first segmental channel 32. For example, the heating member 7 is a metal-made resistor which provides current-generated heat when connected to an external power supply.

In the present embodiment, the first sealing member 5 is made of any material that is melted under heat exerted by the heating member 7, and yet causes no degeneration of a reagent when entering the flow channel or finding its way into the reagent after being melted. In the present embodiment, for example, as described earlier, polypropylene resin or polyester resin may be used as the material of construction of the first sealing member 5.

Upon joining the first member 3 and the second member 4 with each other so that the first abutting face 3*c* and the second abutting face 4*a* can abut against each other, the heating member 7 is brought into contact with the first sealing member 5. Under the heat from the heating member 7, the temperature of the first sealing member 5 is raised to a level equal to or higher than the melting temperature of the first sealing member 5, causing the first sealing member 5 to melt. The melting of the first sealing member 5 uncovers the openings of the first storage section 31 and the first segmental channel 32 in the first abutting face 3*c* for connection of the first storage section 31 and the first segmental channel 32 with the connection channels 40*a*, 40*b*, and 40*c*, thus forming the joined channel 50.

Thus, the present embodiment eliminates the need to remove the first sealing member 5 prior to joining the first member 3 and the second member 4 with each other. This makes it possible to effect measurement in simpler and easier operation. Although the foregoing description deals with the case where the heating member 7 is configured to generate Joule heat under current application, the configuration is not limited to this, and alternatively, the heating member 7 may be configured to generate heat by exploiting exothermic reaction exhibited by compounds, for example. Moreover, although the foregoing description deals with the case where the member that melts the first sealing member 5 by application of heat serves as the unsealing member, any other means capable of melting the first sealing member 5 may be adopted as the unsealing member.

Fourth Embodiment

Figure 9:
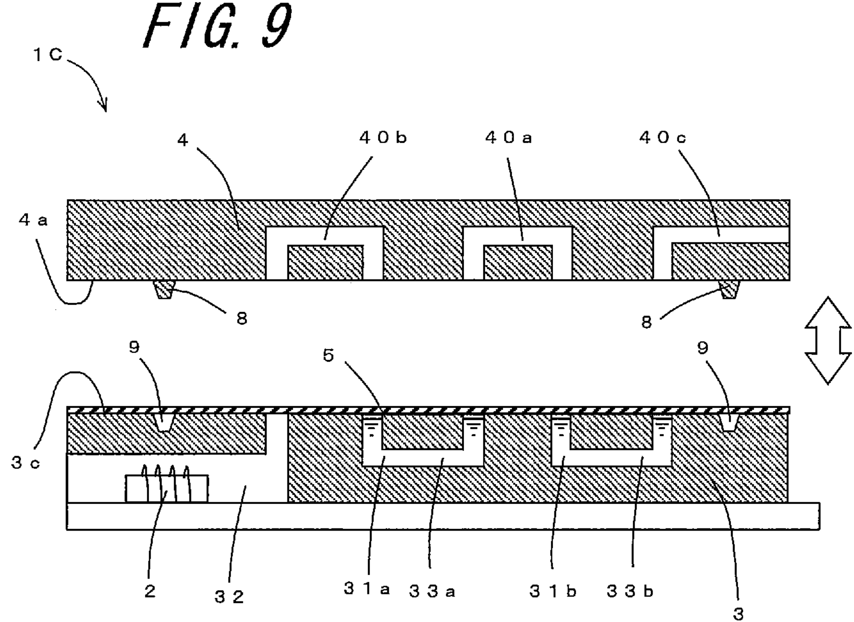
FIG. 9 is a schematic sectional view of a detection sensor 1C in accordance with a fourth embodiment of the disclosure, illustrating its constituent members held in a separated state.
Figure 10:
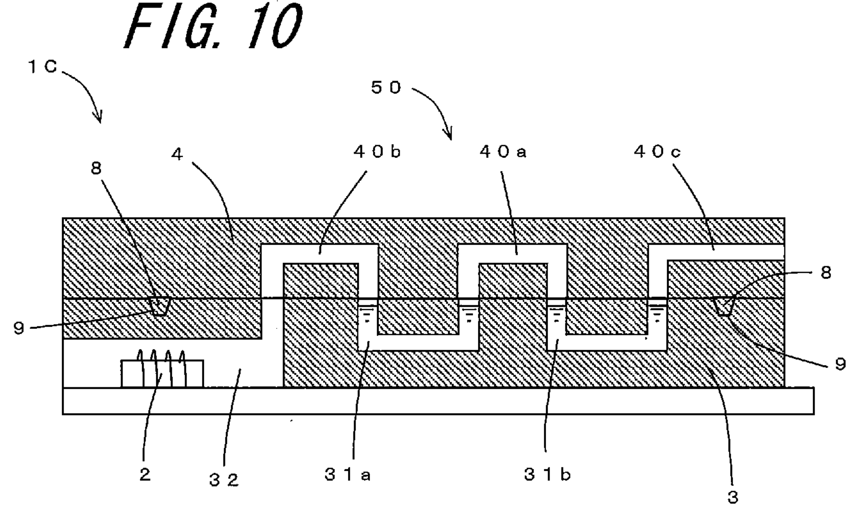
FIG. 10 is a schematic sectional view of the detection sensor 1C, illustrating its constituent members held in a joined state.

FIG. 9 is a schematic sectional view of a detection sensor 1C in accordance with a fourth embodiment of the disclosure, illustrating its constituent members held in a separated state. FIG. 10 is a schematic sectional view of the detection sensor 1C, illustrating its constituent members held in a joined state. As a point of difference from the detection sensor 1 according to the first embodiment, the detection sensor 1C according to the present embodiment additionally includes a guide pin 8 and a guide hole 9 that constitute a positioning structure. Otherwise, the detection sensor 1C is identical to the detection sensor 1, and thus the components that play the same or corresponding roles as in the detection sensor 1 will be identified with the same reference symbols, and the detailed description thereof will be omitted.

In joining the first member 3 and the second member 4 with each other, if the openings of the first storage section 31 and the first segmental channel 32 of the first member 3 are positioned in misaligned relation to the corresponding openings of the connection channels 40*a*, 40*b*, and 40*c* of the second member 4, due to a consequent failure in mutual connection, the joined channel 50 cannot be formed properly. This leads to the leakage of the reagent or clogging of the flow channel. The detection sensor 1C according to the present embodiment includes a positioning structure for connecting the first storage section 31 and the first segmental channel 32 to the connection channels 40*a*, 40*b*, and 40*c* with high accuracy when joining the first member 3 and the second member 4 with each other.

In the present embodiment, the first abutting face 3*c* of the first member 3*a* is provided with a guide hole 9, and, the second abutting face 4*a* of the second member 4 is provided with a guide pin 8. The guide pin 8 is a columnar member protruding from the second abutting face 4*a*. The guide hole 9 is a recess provided with an opening in the second abutting face of the second member 4. The guide pin 8 and the guide hole 9 are intended for positioning, and thus the diameter of the outer periphery of the guide pin 8 is substantially equal to the diameter of the inner periphery of the guide hole 9. In joining the first member 3 and the second member 4 with each other, by fitting the guide pin 8 in the guide hole 9, it is possible to set the first member 3 and the second member 4 in one relative position. In this position, the first storage section 31 and the first segmental channel 32 are connected to the connection channels 40*a*, 40*b*, and 40*c* without misalignment, whereupon the joined channel 50 can be formed properly.

While the present embodiment is implemented by adding the guide pin 8 and the guide hole 9 to the detection sensor 1 according to the first embodiment, the configuration is not limited to this, and alternatively, the present embodiment may be implemented by adding the guide pin 8 and the guide hole 9 to the detection sensor 1A according to the second embodiment or the detection sensor 1B according to the third embodiment. Note that the second embodiment may be configured so that the piercing member 6 serves also as a positioning structure.

Fifth Embodiment

Figure 11:
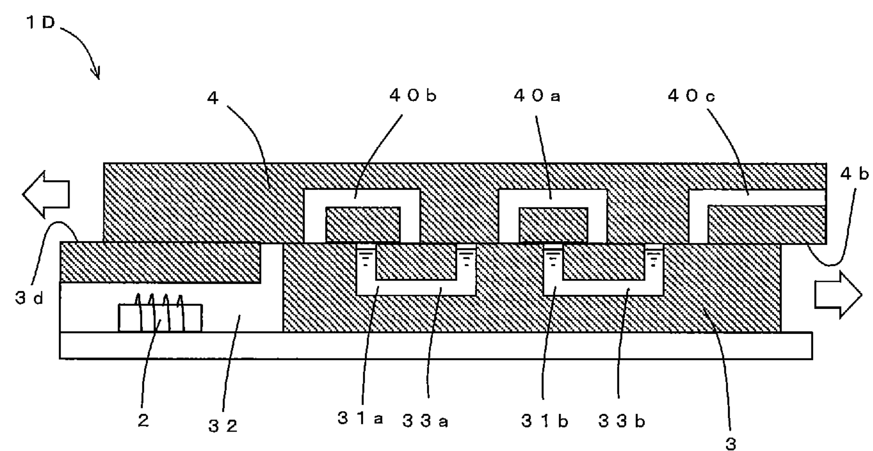
FIG. 11 is a schematic sectional view of a detection sensor 1D in accordance with a fifth embodiment of the disclosure, illustrating its constituent members held in a slidingly separated state.
Figure 12:
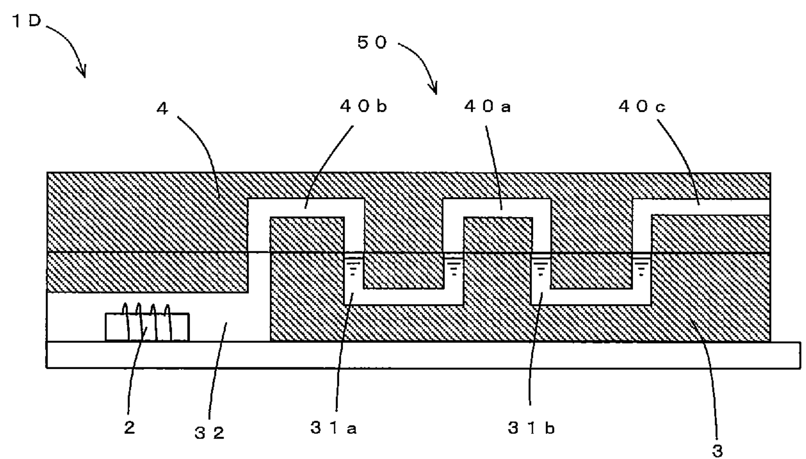
FIG. 12 is a schematic sectional view of the detection sensor 1D, illustrating its constituent members held in a slidingly joined state.

FIG. 11 is a schematic sectional view of a detection sensor 1D in accordance with a fifth embodiment of the disclosure, illustrating its constituent members held in a slidingly separated state. FIG. 12 is a schematic sectional view of the detection sensor 1D, illustrating its constituent members held in a slidingly joined state. In the detection sensor 1D according to the present embodiment, its first member 3 and second member 4 are similar in configuration to the first and second members, respectively, of the detection sensor 1 according to the first embodiment. As a point of difference, in contrast to the first embodiment in which the separate members are joined with each other by abutting the spaced apart first abutting face 3*c* and second abutting face 4*a* against each other to constitute the detection sensor, in the present embodiment, the first member 3 and the second member 4 are slidable linearly in relation to each other. Otherwise, the detection sensor 1D is identical to the detection sensor 1, and thus the components that play the same or corresponding roles as in the detection sensor 1 will be identified with the same reference symbols, and the detailed description thereof will be omitted.

In the present embodiment, a first slide face 3*d* corresponds to the first abutting face 3*c* of the first member 3, and, a second slide face 4*b* corresponds to the second abutting face 4*a* of the second member 4. The detection sensor 1D according to the present embodiment is configured so that the first member 3 and the second member 4 can slide in relation to each other, with the first slide face 3*d* and the second slide face 4*b* kept in contact with each other.

With the constituent members held in a slidingly separated state as shown in FIG. 11, the first storage section 31 and the first segmental channel 32, each provided with an opening in the first slide face 3*d*, are each closed by part of the second slide face 4*b*. Moreover, the connection channels 40*a*, 40*b*, and 40*c*, each provided with an opening in the second slide face 4*b*, are each closed by part of the first slide face 3*d*. In the present embodiment, the second slide face 4*b* performs the same function as that of the first sealing member 5. This eliminates the need to use the first sealing member 5.

By imparting sliding movement to the first member 3 and the second member 4 held in a slidingly separated state so that they can be changed to a slidingly joined state as shown in FIG. 12, it is possible to connect the first storage section 31 and the first segmental channel 32 to the connection channels 40*a*, 40*b*, and 40*c*, and thereby form the joined channel 50.

In the present embodiment, the joined channel 50 can be formed in the detection sensor 1D simply by moving the first member 3 and the second member 4 so that they can slide in relation to each other. Thus, a reagent required for measurement can be fed to the detecting element 2 in simple and easy operation.

Sixth Embodiment

Figure 13:
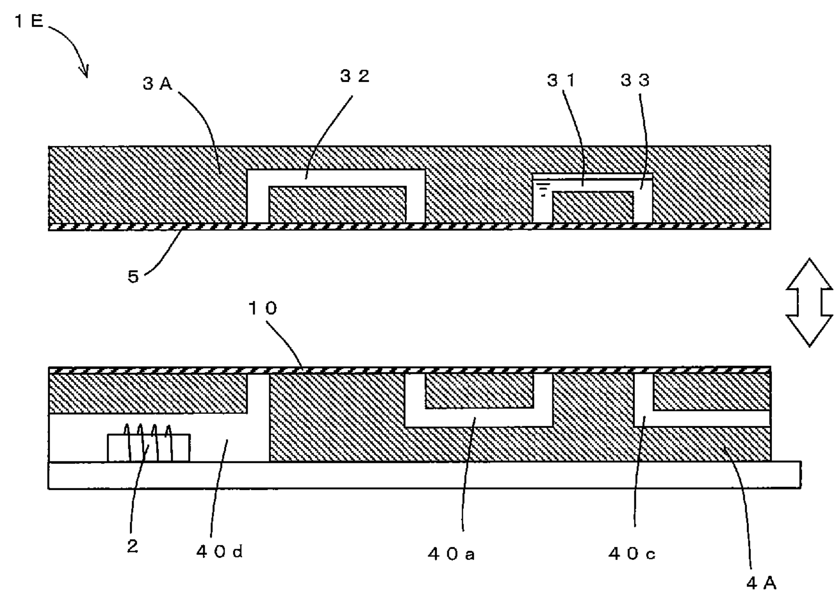
FIG. 13 is a schematic sectional view of a detection sensor 1E in accordance with a sixth embodiment of the disclosure, illustrating its constituent members held in a separated state.
Figure 14:
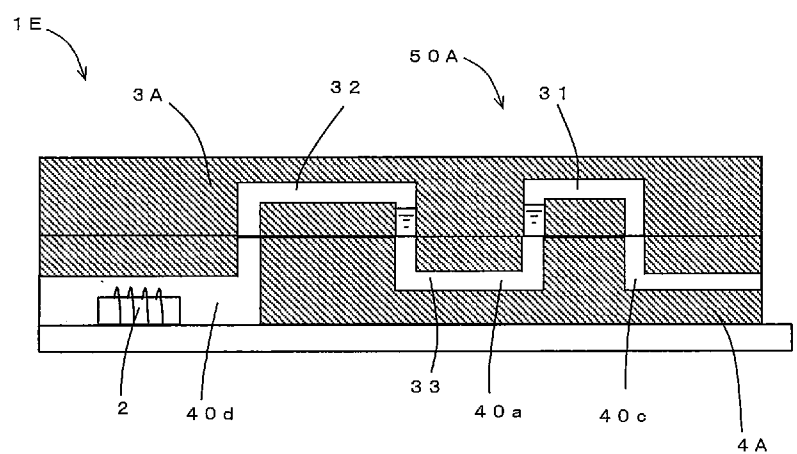
FIG. 14 is a schematic sectional view of the detection sensor 1E, illustrating its constituent members held in a joined state.

FIG. 13 is a schematic sectional view of a detection sensor 1E in accordance with a sixth embodiment of the disclosure, illustrating its constituent members held in a separated state. FIG. 14 is a schematic sectional view of the detection sensor 1E, illustrating its constituent members held in a joined state. The detection sensor 1E according to the present embodiment differs from the detection sensor 1 according to the first embodiment in that the detecting element 2 is located in the flow channel of the second member 4. The components of the detection sensor 1E that play the same or corresponding roles as in the detection sensor 1 will be identified with the same reference symbols, and the detailed description thereof will be omitted.

In a first member 3A of this construction, there is provided the first storage section 31 for storing a first reagent 33. In a second member 4A of this construction, there is provided a second segmental channel 40*d* in which the detecting element 2 is located. The second member 4A includes the connection channel 40*a* which is connected to the first storage section 31 upon joining the first member 3A and the second member 4A with each other. The first member 3A includes the first segmental channel 32 which provides connection between the connection channel 40*a* and the second segmental channel 40*d* upon joining the first member 3A and the second member 4A with each other.

Upon joining the first member 3A and the second member 4A with each other, the first storage section 31 and the first segmental channel 32 of the first member 3A are brought into communication with the connection channels 40*a*, 40*c* and the second segmental channel 40*d* of the second member 4A, thus forming a single joined channel 50A. As shown in FIG. 14, the joined channel 50A is formed as a flow channel maintained in a hermetically sealed condition, which includes the connection channel 40*c*, the first storage section 31, the connection channel 40*a*, the first segmental channel 32, and the second segmental channel 40*d* that communicate with one another in series in the order named.

As is the case with the first embodiment, from the external space, a fluid such as air can be introduced into the joined channel 50A. Upon introduction of a fluid, the fluid forces the first reagent 33 forwardly so that the first reagent 33 can be fed to the detecting element 2.

The following describes modified examples common to the above-described first to sixth embodiments. The following modified examples, while being made in only one of the embodiments, may be applicable to other embodiments.

First Modified Example

While the storage section for storing a reagent is disposed in the first member 3 in the above-described construction, the arrangement is not limited to this, and alternatively, the storage section may be disposed in the second member 4. Moreover, the connection channel for providing communication between the storage section and the external space may be disposed in the first member 3 instead of the second member 4.

Figure 15:
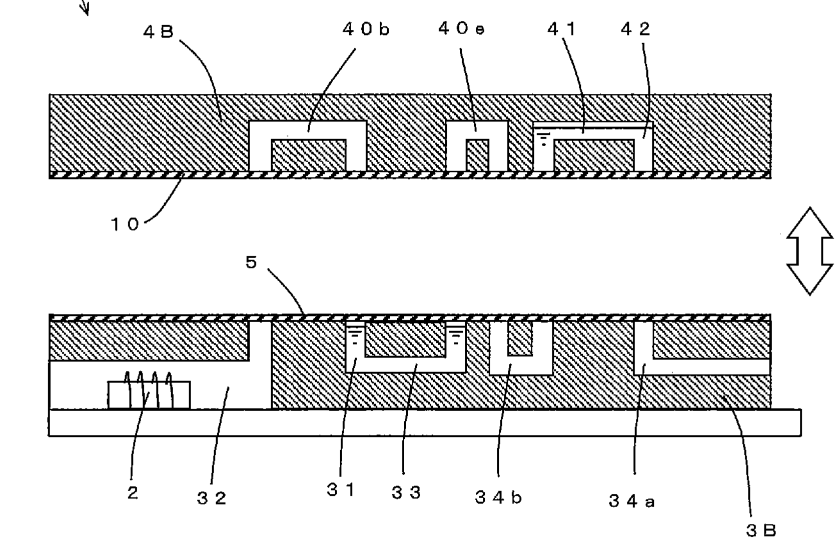
FIG. 15 is a schematic sectional view of a detection sensor 1F given as a first modified example, illustrating its constituent members held in a separated state.
Figure 16:
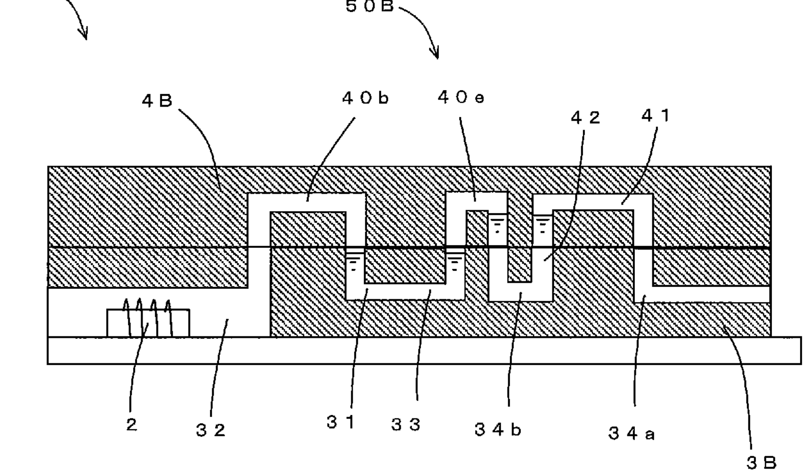
FIG. 16 is a schematic sectional view of the detection sensor 1F, illustrating its constituent members held in a joined state.

FIG. 15 is a schematic sectional view of a detection sensor 1F given as a first modified example, illustrating its constituent members held in a separated state. FIG. 16 is a schematic sectional view of the detection sensor 1F, illustrating its constituent members held in a joined state. As described above, the detection sensor 1F given as the first modified example differs from the detection sensor 1 according to the first embodiment in the configuration of the storage section and the connection channel. Otherwise, the detection sensor 1F is identical to the detection sensor 1, and thus the components that play the same or corresponding roles as in the detection sensor 1 will be identified with the same reference symbols, and the detailed description thereof will be omitted.

In a second member 4B of this construction, there is provided a second storage section 41 for storing a third reagent 42. The second member 4B includes a second sealing member 10 to hermetically close the second storage section 41. Like the first sealing member 5, the second sealing member 10 is provided in the second member 4B.

Moreover, in a first member 3B of this construction, there is provided a connection channel 34*a* for providing communication between the second storage section 41 and the external space. The first member 3B includes a connection channel 34*b* which is connected to the second storage section 41 and the connection channel of the second member 4B, and, the second member 4B includes a connection channel 40*e* for connecting the connection channel 34*b* with the first storage section 31.

In this modification, the first member 3B includes a first channel portion including the connection channel 34*a*, the connection channel 34*b*, the first storage section 31, and the first segmental channel 32 that are spaced-apart independent channel spaces disposed so as not to communicate with one another. The second member 4B includes a second channel portion including the second storage section 41, the connection channel 40*e*, and the connection channel 40*b* that are spaced-apart independent channel spaces disposed so as not to communicate with one another.

Upon joining the first member 3B and the second member 4B with each other, the connection channel 34*a*, the connection channel 34*b*, the first storage section 31, and the first segmental channel 32 of the first member 3B are brought into communication with the second storage section 41, the connection channel 40*e*, and the connection channel 40*b* of the second member 4B, thus forming a single joined channel 50B.

As shown in FIG. 16, the joined channel 50B is formed as a flow channel maintained in a hermetically sealed condition, which includes the connection channel 34*a*, the second storage section 41, the connection channel 34*b*, the connection channel 40*e*, the first storage section 31, the connection channel 40*b*, and the first segmental channel 32 that communicate with one another in series in the order named. As is the case with the first embodiment, from the external space, a fluid such as air can be introduced into the joined channel 50B. Upon introduction of a fluid, the fluid forces the third reagent 42 and the first reagent 33 forwardly, and, after the first reagent 33 is fed to the detecting element 2, the third reagent 42 is fed to the detecting element 2.

Second Modified Example

Figure 17:
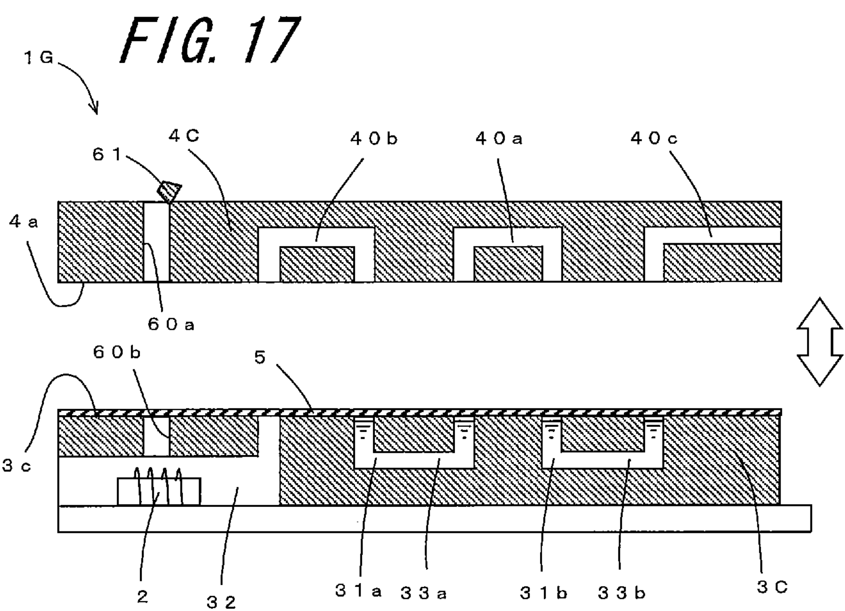
FIG. 17 is a schematic sectional view of a detection sensor 1G given as a second modified example, illustrating its constituent members held in a separated state.
Figure 18:
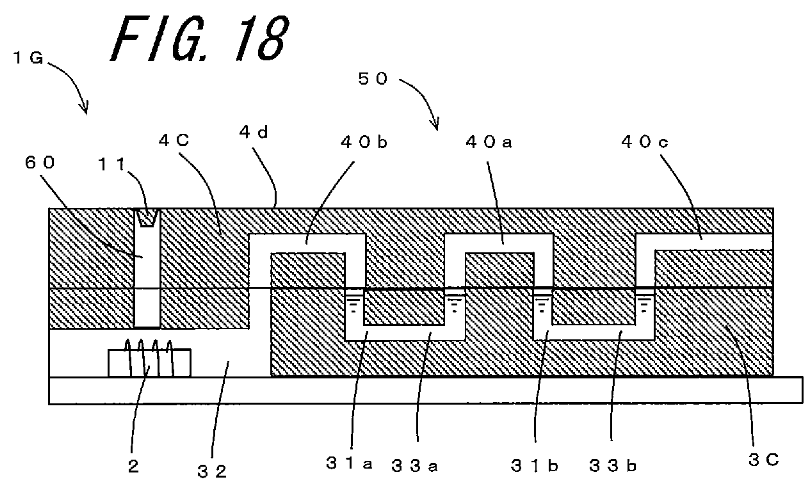
FIG. 18 is a schematic sectional view of the detection sensor 1G, illustrating its constituent members held in a joined state.

In the present modified example, there is provided a feeding channel which serves as a feeding section for feeding a sample to the detecting element 2. FIG. 17 is a schematic sectional view of a detection sensor 1G given as a second modified example, illustrating its constituent members held in a separated state. FIG. 18 is a schematic sectional view of the detection sensor 1G, illustrating its constituent members held in a joined state. As a point of difference from the detection sensor 1 according to the first embodiment, the detection sensor 1G given as the present modified example additionally includes a feeding channel 60. Otherwise, the detection sensor 1G is identical to the detection sensor 1, and thus the components that play the same or corresponding roles as in the detection sensor 1 will be identified with the same reference symbols, and the detailed description thereof will be omitted.

In a first member 3C of this construction, there is provided a first feeding channel 60*a* constituting part of the feeding channel 60. One of the openings of the first feeding channel 60*a* is opposed to the detecting element 2, and the other opening is located in the first abutting face 3*c*. In a second member 4C of this construction, there is provided a second feeding channel 60*b* constituting part of the feeding channel 60. The second feeding channel 60*b* is formed so as to pass through the second member 4C in its thickness direction. One of the openings of the second feeding channel 60*b* is located in the second abutting face 4*a*, and the other opening is located in a surface 4*d* opposite the second abutting face 4*a*.

With the constituent members held in a joined state as shown in FIG. 18, the first feeding channel 60*a* and the second feeding channel 60*b* combine to permit communication between the external space and the first segmental channel 32 in which the detecting element 2 is located. Thus, the feeding channel 60 allows a sample to be fed from the exterior to the detecting element 2.

At the opening of the feeding channel 60, a lid body 61 is provided so as to prevent entry of unnecessary substances other than the sample into the first segmental channel 32. The opening of the feeding channel 60 remains closed by the lid body 61 during non-sample-feeding time. The lid body 6 can be either a lid body which opens and closes the external space-side opening or a lid body which opens and closes the first segmental channel 32—side opening.

Third Modified Example

Figure 19:
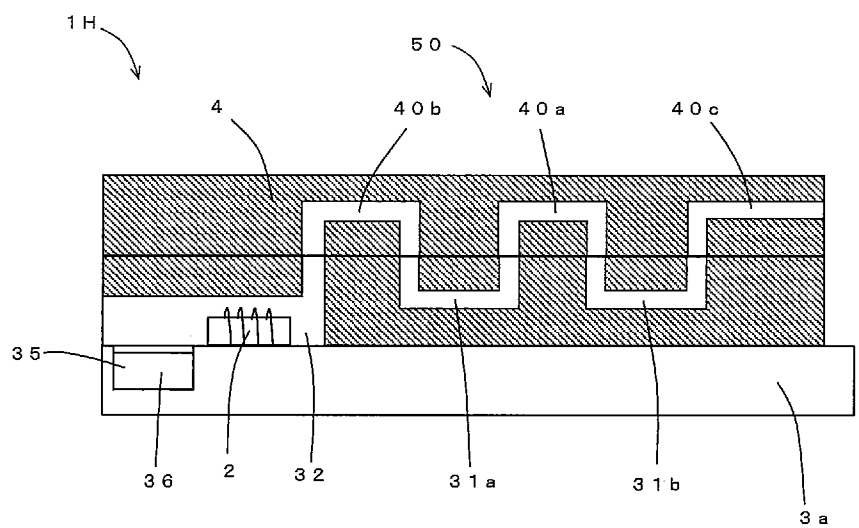
FIG. 19 is a schematic sectional view of a detection sensor 1H given as a third modified example, illustrating its constituent members held in a joined state.

In the present modified example, there is provided a used reagent storage section for storing a reagent, as well as a sample, which has already been used for measurement. FIG. 19 is a schematic sectional view of a detection sensor 1H given as a third modified example, illustrating its constituent members held in a joined state. As a point of difference from the detection sensor 1 according to the first embodiment, the detection sensor 1H given as the present modified example additionally includes a used reagent storage section 35. Otherwise, the detection sensor 1H is identical to the detection sensor 1, and thus the components that play the same or corresponding roles as in the detection sensor 1 will be identified with the same reference symbols, and the detailed description thereof will be omitted.

The used reagent storage section 35 is located downstream from the detecting element 2 in a flowing direction in which a reagent flows through the joined channel 50. The used reagent storage section 35 may be made in any form capable of storing a mixture of a sample and a reagent. In the present modified example, the used reagent storage section 35 has the form of a recess formed in a part of the base 3*a* which faces the first segmental channel 32.

The reagent flows through the interior of the joined channel 50 while being forced toward the detecting element 2 by a fluid introduced from the exterior, passes over the detecting element 2, and finds its way into the used reagent storage section 35. This arrangement makes it possible to restrain the detecting element 2 from further exposure to the used reagent, and to reduce the backflow of the used reagent within the joined channel 50. Moreover, in the present modified example, the used reagent storage section 35 internally includes an absorber 36 capable of absorption of at least one of the sample and the reagent. The absorber 36 retains the used reagent within the used reagent storage section 35.

Fourth Modified Example

Figure 20:
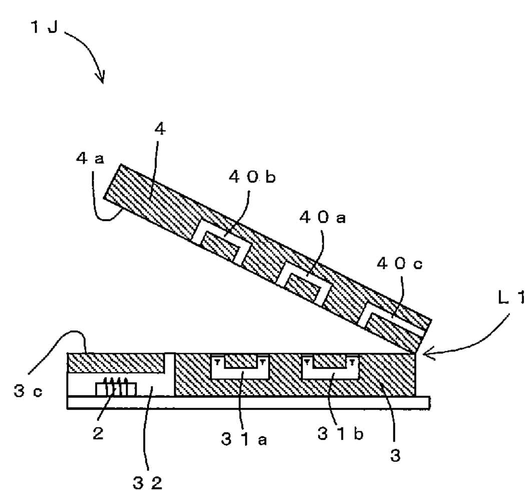
FIG. 20 is a schematic sectional view of a detection sensor 1J given as a fourth modified example in its folded position.

In the present modified example, as a positioning structure, the first member 3 and the second member 4 are configured to be connected together at one side L1 for relative angular displacement about an axis defined by the side L1. FIG. 20 is a schematic sectional view of a detection sensor 1J given as a fourth modified example in its folded position. As a point of difference from the detection sensor 1 according to the first embodiment, the detection sensor 1J given as the present modified example can be folded at a junction between the first member 3 and the second member 4. Otherwise, the detection sensor 1J is identical to the detection sensor 1, and thus the components that play the same or corresponding roles as in the detection sensor 1 will be identified with the same reference symbols, and the detailed description thereof will be omitted.

In the present modified example, the first member 3 and the second member 4 are connected together, with their first and second abutting faces 3*c* and 4*a* opposed to each other, at the opposed sides of the first and second abutting faces. For example, the sides are connected together by a soft resin, or may be hingedly connected together. The detection sensor 1J is folded at the side L1 serving as the junction of the first member 3 and the second member 4. This foldable structure allows the first abutting face 3*c* and the second abutting face 4*a* to be kept in contact with each other, in one relative positional relation. Thus, the first storage section 31 and the first segmental channel 32 are connected to the connection channels 40*a*, 40*b*, and 40*c* without misalignment, whereupon the joined channel 50 can be formed properly.

Seventh Embodiment

Figure 21:
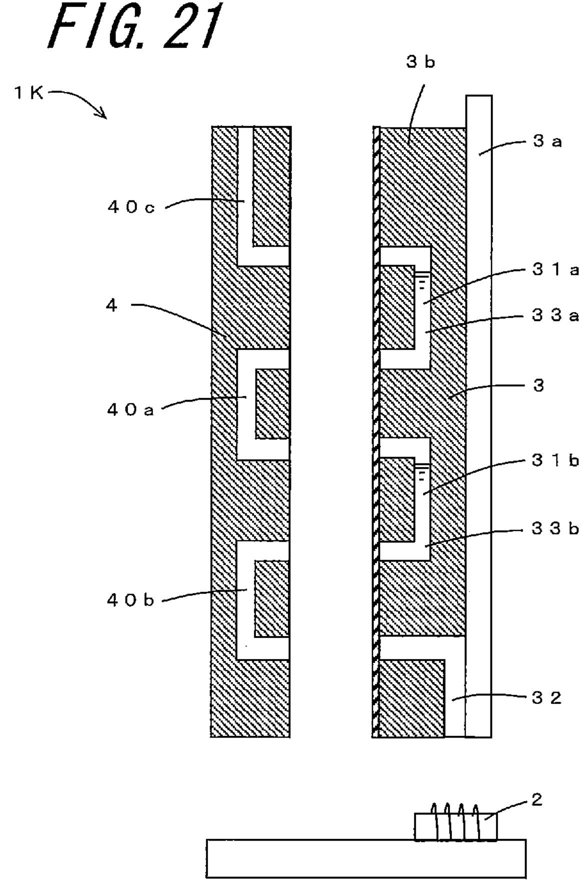
FIG. 21 is a schematic sectional view of a detection sensor 1K in accordance with a seventh embodiment of the disclosure, illustrating its constituent members held in a separated state.

FIG. 21 is a schematic sectional view of a detection sensor 1K in accordance with a seventh embodiment of the disclosure, illustrating its constituent members held in a separated state. As a point of difference from the detection sensor 1 according to the first embodiment, the detection sensor 1K according to the present embodiment does not include the detecting element 2. The components of the detection sensor 1K that play the same or corresponding roles as in the detection sensor 1 will be identified with the same reference symbols, and the detailed description thereof will be omitted.

By joining the first member 3 and the second member 4 with each other so that their first abutting face 3*c* and second abutting face 4*a* can abut against each other, it is possible to bring the first storage section 31 and the first segmental channel 32 constituting the first channel portion 30 of the first member 3 into communication with the connection channels 40*a*, 40*b*, and 40*c* constituting the second channel portion 40 of the second member 4, and thereby form a single joined channel 50. The joined channel 50 is a flow channel including the connection channel 40*c*, the second region 31*b*, the connection channel 40*a*, the first region 31*a*, the connection channel 40*b*, and the first segmental channel 32 that communicate with one another in series in the order named.

As is the case with the foregoing embodiment, from the external space, a fluid such as air can be introduced into the joined channel 50. Upon introduction of a fluid, the fluid forces the first reagent 33*a* and the second reagent 33*b* out of the joined channel 50. The detecting element 2 may be located in any location where it can be exposed to the first reagent 33*a* and the second reagent 33*b* from the joined channel 50.

In the exemplification shown in FIG. 21, the first member 3 and the second member 4, each set in a vertically oriented condition, are joined with each other so that the first abutting face 3*c* and the second abutting face 4*a* can abut against each other. With the joined channel 50 formed in such a vertically oriented construction, without the introduction of a fluid, the first reagent 33*a* and the second reagent 33*b* pass flowingly through the interior of the joined channel 50 and are discharged out of the joined channel 50 under their own weights. For example, where the detecting element 2 is placed immediately below the vertically oriented detection sensor 1K in the vertical direction, the discharged first and second reagents 33*a* and 33*b* fall in drops toward the detecting element 2 from a location immediately above the detecting element 2 in the vertical direction. The detecting element 2 thereby exposed to the reagents becomes capable of measurement.

Eighth Embodiment

Figure 22:
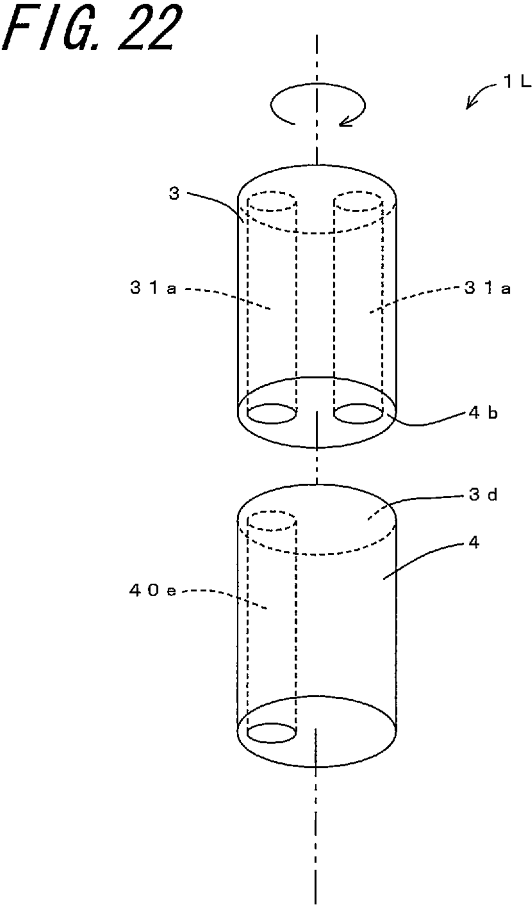
FIG. 22 is an exploded perspective view schematically showing a detection sensor 1L in accordance with an eighth embodiment of the disclosure.

FIG. 22 is an exploded perspective view schematically showing a detection sensor 1L in accordance with an eighth embodiment of the disclosure. The detection sensor 1L according to the present embodiment differs from the detection sensor 1D according to the fifth embodiment in that the first member 3 and the second member 4 are configured for sliding movement in a rotational direction. Otherwise, the detection sensor 1L is identical to the detection sensor 1D, and thus the components that play the same or corresponding roles as in the detection sensor 1 will be identified with the same reference symbols, and the detailed description thereof will be omitted.

For example, the first member 3 and the second member 4, each in the form of a cylinder, are aligned on one central axis. The bottom face of the first member 3 and the bottom face of the second member 4, which abut against each other, serve as the first slide face 3*d* and the second slide face 4*b*, respectively. The first member 3 includes the first region 31*a* and the second region 31*b* that constitute the first storage section 31. The first region 31*a* and the second region 31*b* are each made as a tubular region disposed in parallel with the axis of the first member 3. Each of the first region 31*a* and the second region 31*b* is provided with at least a circular opening in the first slide face 3*d*. For example, the opening of the first region 31*a* and the opening of the second region 31*b* have the same diameter, or may be made to have different diameters, depending on the type of the enclosed reagent as described later. The distance between the center of the opening of the first region 31*a* and the central axis is equal to the distance between the center of the opening of the second region 31*b* and the central axis. That is, for example, the openings are arranged side by side, with the central axis in between.

The second member 4 includes at least the connection channel 40*e* made as a tubular channel disposed in parallel with the axial direction. The connection channel 40*e* is provided with circular openings in the opposite bottom faces, respectively, of the second member 4. The opening of the second slide face 4*b*, which provides communication between the connection channel 40*e* and the first region 31*a* or the second region 31*b*, has a diameter which is greater than or equal to the diameter of the opening of the first region 31*a* and the diameter of the opening of the second region 31*b*, for example.

The first member 3 and the second member 4 are configured for relative rotation about the central axis, with the first slide face 3*d* and the second slide face 4*b* kept in contact with each other. In the detection sensor 1L, prior to its being placed in service, the openings of the first region 31*a* and the second region 31*b* in the first slide face 3*d* remain closed by a part of the second slide face 4*b* other than the opening of the connection channel 40*e*. The first reagent 33*a* is enclosed in the first region 31*a*, and the second reagent 33*b* is enclosed in the second region 31*b*. When the detection sensor 1L is put into service, firstly, the first member 3 and the second member 4 are rotated about the central axis for relative sliding movement to permit communication between the first region 31*a* and the connection channel 40*e*, whereupon the first reagent 33*a* enclosed in the first region 31*a* flows into the connection channel 40*e*, and then flows out of the detection sensor 1L. Next, further rotational sliding movement is imparted to the first member 3 and the second member 4 to permit communication between the second region 31*b* and the connection channel 40*e*, whereupon the second reagent 33*b* enclosed in the second region 31*b* flows into the connection channel 40*e*, and then flows out of the detection sensor 1L.

For example, in the first member 3, the first region 31*a* and the second region 31*b* may be provided with another opening in the bottom face opposite the first slide face 3*d*. In this case, when the region is brought into communication with the connection channel 40*e*, fluid can be introduced from this opening to force the reagent forwardly. As an alternative to forming such an opening, as is the case with the detection sensor 1K according to the seventh embodiment, as shown in FIG. 22, by setting the detection sensor 1L in a vertically oriented condition, when the first region 31*a* or the second region 31*b* is brought into communication with the connection channel 40*e*, the reagent flows into the connection channel 40*e* and is then discharged under its own weight.

Moreover, for example, with use of a ratchet mechanism or the like, the first member 3 and the second member 4 may be configured for relative rotational sliding movement in one common direction. In this case, the communication between the first region 31*a* and the connection channel 40*e* and the communication between the second region 31*b* and the connection channel 40*e* are made in limited predetermined orders. This diminishes the likelihood of a mistake of feeding a plurality of reagents to the detecting element 2 in a wrong order.

The following describes a detection sensor kit in accordance with an embodiment of the disclosure. The detection sensor kit is a kit of constituent members for the above-described detection sensor (1 to 1J) assembly. For example, the first member 3 and the second member 4 are separately prepared as discrete members that are assembled into a sensor by a measurement operator at the time of measurement. For example, in the case for the detection sensor 1A, there are prepared the first member 3, the second member 4, the first sealing member 5, and the piercing member 6 separately as discrete members that are assembled into a sensor. Moreover, a plurality of members may be formed integral with each other or assembled to each other in advance, and more specifically, for example, the piercing member 6 is assembled to the second member 4 in advance, or the first sealing member 5 is hermetically attached to the first member 3 to enclose the first reagent 33*a* and the second reagent 33*b* in advance. For example, in the case for the detection sensor 1H, the detecting element 2, the used reagent storage section 35, the absorber 36, etc. are assembled in the interior of the first segmental channel 32 in advance.

Figure 23:
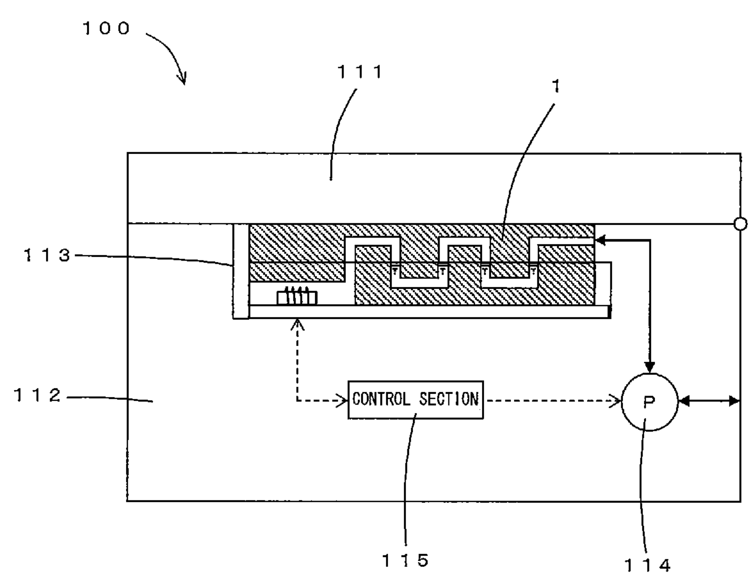
FIG. 23 is a schematic drawing showing the structure of a sensor device 100.

The following describes a sensor device in accordance with an embodiment of the disclosure. FIG. 23 is a schematic drawing showing the structure of a sensor device 100. The sensor device 100 includes the detection sensor 1 and a reader 112 in which the detection sensor 1 is detachably mounted. Although the following description deals with the case of adopting the detection sensor 1, the sensor device 100 may be equipped with each and every one of the detection sensors 1 to 1L. The detection sensor 1 is made as a disposable cartridge. The used detection sensor 1 is replaced with a new detection sensor 1 which is set in the reader 112 for liquid sample sensing operation.

The reader 112 serves as a measurement portion that supplies electric signals to the detection sensor 1, and receives electric signals outputted from the detection sensor 1. The reader 112 includes a housing section 113 to receive the detection sensor 1, a pump 114 serving as a fluid feeding section that feeds a fluid (air) to the joined channel 50 of the received detection sensor 1, and a control section 115 that exercises electric signal input-output control, controls the operation of the pump 114, and performs calculation operation on detection results, etc.

The following describes a method for producing a detection sensor and a detection method in accordance with an embodiment of the disclosure. As described above, the detection sensor 1 is prepared with its constituent members held in a separated state. For example, a measurement operator imparts relative movement to the first member 3 and the second member 4 so that they can be combined into the measurement-capable detection sensor 1 provided with the joined channel 50. The thereby obtained detection sensor 1, which is now ready for measurement, is set in the housing section 113 of the reader 112 to start measurement. Upon start-up of the measurement operation, the control section 115 performs control of the pump 114 in a manner to introduce air into the joined channel 50 of the detection sensor 1, as well as to feed a reagent stored in the detection sensor 1 to the detecting element 2. Moreover, the control section 115 supplies an electric signal to the detecting element 2. Meanwhile, a sample is fed to the detecting element 2 in a separate process, and, the control section 115 performs calculation operation on the basis of the electric signal received from the detecting element 2 to detect an object to be detected contained in the sample. The order in which the supply of the reagent, the supply of the electric signal, and the supply of the sample are performed is suitably determined according to the types of the reagent for use, the detection object contained in the sample, the method of calculation operation, etc. For example, the electric signal is supplied first, and then the sample is supplied, followed by the supply of the reagent, whereby a specific reaction is induced in the detection object. The control section 115 detects the detection object on the basis of variation in the electric signal received from the detecting element 2.

As to the supply of the sample, the sample may be fed using, for example, the feeding channel 60 provided in the earlier described detection sensor 1F. Alternatively, after feeding the sample to a location downstream from the detecting element 2 in advance, the detection sensor 1 is set in the reader 112, followed by operation of the pump 114 which performs the function of acting as a fluid sucking section to suck in the fluid within the joined channel 50. Under the resultant suctioning effect, the sample present in the location downstream from the detecting element 2 flows backward, viz., flows upstream through the joined channel 50 so as to be fed to the detecting element 2. Note that the fluid is sucked to such an extent that no outflow of the reagent will result, or, alternatively, a suction port may be formed in a part of the first segmental channel 32 located upstream of the detecting element 2 to perform suctioning. After feeding the sample to the detecting element 2 by the suctioning process, as described earlier, air is fed into the joined channel 50 to force the reagent toward the detecting element 2, and, the detecting element 2 supplied with the reagent detects the detection object.

Instead of a structure in which the detection sensor 1 in a joined state as described above is mounted in the reader 112, as a modified example, the detection sensor 1 in a separated state may be mounted in the reader 112. In this case, a mechanical structure of the reader 112, for example, an opening-and-closing structure of a lid portion 111 which covers the housing section 113, may be utilized to combine the constituent members into the detection sensor 1. Upon the closing of the lid portion 111, the second member 4 of the detection sensor 1 in a separated state is pressed from above by the lid portion 111, whereupon the second member 4 and the first member 3 are joined with each other, thus forming the joined channel 50. This arrangement eliminates the need to join the constituent members with each other prior to setting the detection sensor 1 in the reader 112. In the case for the detection sensor 1D, upon the closing of the lid portion 111, the first member 3 and the second member 4 of the detection sensor 1D slide in relation to each other, thus forming the joined channel 50. Moreover, in the case for the detection sensor 1J, upon the closing of the lid portion 111, the detection sensor 1J is folded so that the second member 4 and the first member 3 can be joined with each other, thus forming the joined channel 50.

Other Modified Examples

In the construction thus far described, the first abutting face 3*c* of the first member 3*a* and the second abutting face 4*a* of the second member 4 are each made flat. Thus, upon joining the first member 3 and the second member 4 with each other, these flat abutting faces entirely abut against each other. Note that each abutting face is not limited to a flat face, and may alternatively be made as a curved face or a face having surface irregularities. Moreover, the two abutting faces do not necessarily have to have the same shape, and each of them may be given any suitable shape as long as the abutting faces be made to abut against each other for permitting communication between the first channel portion 30 of the first member 3 and the second channel portion 40 of the second member 4.

Although the following description deals with the case where the detecting element 2 is located downstream from the storage section for storing a reagent such as the first storage section 31 in the joined channel 50, the arrangement is not so limited. Alternatively, the detecting element 2 may be located upstream from the reagent storage section in the joined channel 50. Moreover, where a plurality of storage sections are provided, the construction may be configured so that the storage section is disposed in each of a location upstream from the detecting element 2 and a location downstream from the detecting element 2.

The number of storage sections for storing a reagent provided in each of the first member 3 and the second member 4 is not limited to the number adopted in the embodiments of the disclosure. Either one or two or more storage sections may be provided. Moreover, where only one of the first member 3 and the second member 4 includes a storage section, the storage section serves as the first storage section, and, that one of the constituent members which includes the first storage section is defined as the first member 3. On the other hand, where the first member 3 and the second member 4 each include a storage section, there is no distinction between the two members, and thus, when one of the members is defined as the first member 3, then the other is defined as the second member 4. That is, the terms "first member 3" and "second member 4" are used merely to distinguish the two members from each other in the interest of clarity. Thus, where the two members each include the storage section, each member can be either the first member 3 or the second member 4.

REFERENCE SIGNS LIST

1, 1A, 1B, 1C, 1D, 1E, 1F, 1G, 1H, 1J, 1K, 1L: Detection sensor
2: Detecting element
3: First member
3A, 3B: First member
3*a*: Base
3*b*: Main body
3*c*: First abutting face
3*d*: First slide face
4, 4A, 4B: Second member
4*a*: Second abutting face
4*b*: Second slide face
4*d*: Surface
5: First sealing member
6: Piercing member
7: Heating member
7*a*, 7*b*: Metallic film
8: Guide pin
9: Guide hole
10: Second sealing member
11, 13: First IDT electrode
12, 14: Second IDT electrode
15: First extraction electrode
16: Second extraction electrode
30: First channel portion
31: First storage section
31*a*: First region
31*b*: Second region
32: First segmental channel
33, 33*a*: First reagent
33*b*: Second reagent
34*a*, 34*b*: Connection channel
35: Used reagent storage section
36: Absorber
40: Second channel portion
40*a*, 40*b*, 40*c*, 40*d*, 40*e*: Connection channel
41: Second storage section
42: Third reagent
50, 50A: Joined channel
60: Feeding channel
60*a*: First feeding channel
60*b*: Second feeding channel
61: Lid body
100: Sensor device
111: Lid portion
112: Reader
113: Housing section
114: Pump
115: Control section

The invention claimed is:

1. A detection sensor, comprising:
a first member comprising a first channel portion, the first channel portion comprising a first storage section which stores a reagent which is fed to a detecting element that detects a detection object contained in a sample, and a first segmental channel which is independent of the first storage portion; and
a second member comprising a second channel portion, wherein the second member is movable relative to the first member and configured to be joined with the first member,
wherein a joined channel in which the first channel portion and the second channel portion communicate with each other is formed only when the first member and the second member are joined with each other, and
wherein the joined channel forms a single path through which the sample travels from an external source through the second channel portion, the first channel portion and then through the first segmental channel to arrive at the detecting element.

2. The detection sensor according to claim 1, wherein the first member and the second member are connectable to and separable from each other.

3. The detection sensor according to claim 1, wherein the reagent comprises a first reagent and a second reagent which differs from the first reagent,
the first storage section of the first member comprises a first region which stores the first reagent and a second region which stores the second reagent, and
the second channel portion of the second member is connected to the first region and the second region of the first storage section.

4. The detection sensor according to claim 3, wherein a gas is present in a part of the joined channel that lies between the first reagent and the second reagent.

5. The detection sensor according to claim 2, wherein the first member further comprises a first sealing member capable of hermetically closing the first storage section, the second member further comprises a first unsealing member capable of unsealing the first sealing member, and the joined channel in which the first channel portion and the second channel portion communicate with each other is formed by unsealing the first sealing member by the first unsealing member.

6. The detection sensor according to claim 1, wherein at least one of the first member and the second member further comprises a feeding section which can be connected to the joined channel to feed the sample to the detecting element.

7. The detection sensor according to claim 1, further comprising:

a used reagent storage section which stores the reagent and the sample that have been fed to the detecting element.

8. A sensor device, comprising:

a detection sensor according to claim 1; and a measurement portion in which the detection sensor is detachably mounted.

9. The sensor device according to claim 8, further comprising:

a fluid feeding section capable of introducing a fluid into the joined channel of the detection sensor.

10. The sensor device according to claim 9, further comprising:

a fluid sucking section capable of sucking in a fluid from the joined channel of the detection sensor.

11. A detection sensor kit, comprising:

a first member comprising a first channel portion, the first channel portion comprising a first storage section which stores a reagent which is fed to a detecting element that detects a detection object contained in a sample, and a first segmental channel which is independent of the first storage portion;

a second member comprising a second channel portion, which wherein the second member is movable relative to the first member and configured to be joined with the first member;

a reader configured to receive an output from the detecting element and perform a calculation based on the output, wherein a joined channel in which the first channel portion and the second channel portion communicate with each other is formed only when the first member and the second member are joined with each other, and wherein the joined channel forms a single path through which the sample travels from an external source through the second channel portion, the first channel portion and then through the first segmental channel to arrive at the detecting element.

12. The detection sensor kit according to claim 11, further comprising:

a first sealing member which hermetically closes the first channel portion; and a first unsealing member which unseals the first sealing member, wherein, in the joined state, the first sealing member is unsealed by the first unsealing member and forms the joined channel.

13. A method of producing the detection sensor according to claim 1, comprising:

a step of imparting relative movement to the first member and the second member and forming a joined channel in which the first channel portion and the second channel portion communicate with each other.

14. A detection method, comprising:

a step of preparing a detection sensor comprising a first member comprising a first channel portion, the first channel portion comprising a first storage section which stores a reagent which is fed to a detecting element that detects a detection object contained in a sample, and a first segmental channel which is independent of the first storage portion, and a second member comprising a second channel portion, which is movable relative to the first member;

a step of forming a joined channel in which the first channel portion and the second channel portion communicate with each other by joining the first member to the second member, wherein the joined channel forms a single path through which the sample travels from an external source through the second channel portion, the first channel portion and then through the first segmental channel to arrive at the detecting element;

a step of mounting the detection sensor in a measurement portion;

a step of introducing a fluid into the joined channel of the detection sensor;

a step of feeding the reagent to the detecting element;

a step of feeding the sample through the joined channel to the detecting element; and a step of detecting the detection object by the detecting element.

15. A detection sensor, comprising:

a first member comprising a first channel portion comprising a first storage section which stores a reagent which is fed to a detecting element that detects a detection object contained in a sample; and a second member comprising a second channel portion, which is movable relative to the first member, the first storage section comprising a first region that stores a first reagent and a second region that stores a second reagent, wherein the second region is independent of the first region and the second reagent is different from the first reagent, wherein a joined channel in which the first channel portion and the second channel portion communicate with each other is formed only when the first member and the second member are joined with each other, and wherein the joined channel forms a single path through which the sample travels from an external source through the second channel portion, the first channel portion and then through the first segmental channel to arrive at the detecting element.

* * * * *